Jan. 23, 1945. U. A. PROVIDENCE 2,367,689
TURNBUCKLE JIG
Filed July 9, 1943
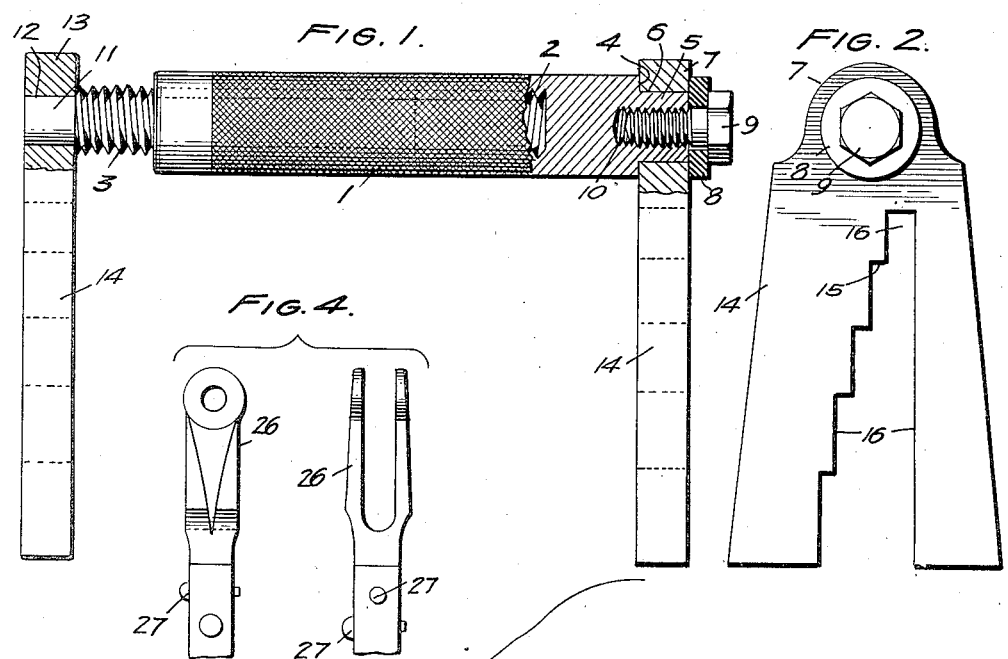
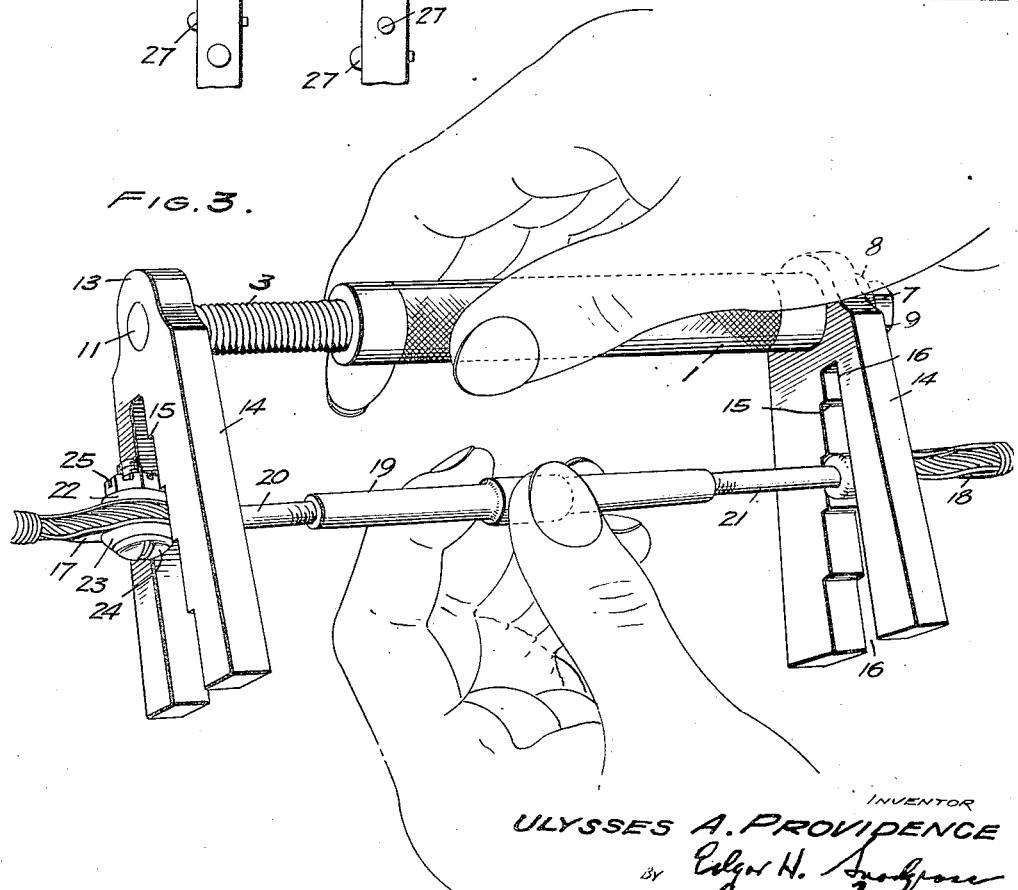
INVENTOR
ULYSSES A. PROVIDENCE
BY
ATTORNEYS Patented Jan. 23, 1945

2,367,689

UNITED STATES PATENT OFFICE 2,367,689

TURNBUCKLE JIG

Ulysses A. Providence, Harrisburg, Pa.

Application July 9, 1943, Serial No. 494,031

4 Claims. (Cl. 81—13)

(Granted under the act of March 3, 1883, as amended April 30, 1928; 370 O. G. 757)

The invention described herein may be manufactured and used by or for the Government for governmental purposes, without the payment to me of any royalty thereon.

This invention has reference to a hand tool or jig for preventing undesirable rotation between relatively rotatable units of manually adjustable couplings or comparable devices, such as turnbuckles and tubing and connectors, particularly during adjustment of such devices and an object of the invention is to eliminate the need of more than a single workman for making such adjustment.

The tool is especially adapted for use by an airplane rigger when adjusting the tension of wires, control cables, etc., in aircraft installations and may be used as a turnbuckle jig for holding the screw-threaded end fittings of a turnbuckle against rotation when the barrel of the turnbuckle is rotated: thereby preventing undesirable twist or torque in the cables or other elements connected and coupled by the turnbuckle. In airplane rigging operations and with a free choice of currently available tools, the joint efforts of several riggers frequently are necessary to adjust tension and throws at the turnbuckles. With the aid of the subject invention, however, one rigger, working alone, is enabled to perform all the functions required in the adjusting operation and his erstwhile helpers may be assigned to other rigging tasks with a consequent speeding up of the rigging operation.

With the above and other advantages in view, the invention comprises the novel construction, combination, and arrangement of parts hereinafter more fully described and pointed out in connection with the accompanying drawing, wherein Figure 1 is a side view of the device, partly in elevation and partly in section, Figure 2 is an end view thereof, Figure 3 is a perspective view showing the application of the device to a turnbuckle, and Figure 4 is a view showing side and end elevations of tube fittings to which the tool is also adapted to be applied.

In the drawing, 1 indicates the handle of the tool which comprises a knurled sleeve or cylinder having a screw-threaded bore 2 which extends inwardly of one end thereof to receive an elongated screw rod 3. The sleeve is reduced in diameter at the other end to provide a shoulder 4 and a short shank or journal 5. The journal 5 is engaged, with a running fit, in an opening 6 at one end of a jaw member 7. The latter is releasably supported on the journal substantially in close confinement between the shoulder 4 at the inner end of the journal and a retainer disk or washer 8 abutting the outer end of the journal. The washer 8 is maintained in position by the head of a short cap screw 9 screwed into the threaded bore 10 of the journal. The handle 1, therefore, may be turned relative to the jaw member 7 to move the screw rod 3 inwardly or outwardly of the bore 2. The outer end portion 11 of the screw rod 3 has a press fit in an opening 12 at one end of a jaw member 13 which is thereby supported in spaced parallel relation with the handle-supported jaw member 7.

The pendent jaw members 7 and 13 are identical in construction and respectively include a bifurcated portion or fork 14 adapted to straddle the turnbuckle fittings used to connect the cable ends in line with the turnbuckle barrel. Steps 15 are formed on the inner face of one of the prongs of each fork to provide, in conjunction with confronting face portions of the opposite prong, differently sized slots or jaws 16 to fit various types and sizes of turnbuckle end-fittings. As shown in Figures 2 and 3 of the drawing the risers of the steps are of equal depth and are normal, i. e. perpendicular, to the straight work-engaging surface of the opposite prong while the treads of the steps are parallel to the said straight surface and are of successively increasing length toward the open end of the bifurcated portion 14. The resultant successive slots 16 of the respective jaw members, though varying in size and shape, are therefore of rectangular contours best adapted for engagement with turnbuckle end-fittings; the innermost and smaller slots of the members being oblong and the larger and outermost slots being square so that the members may be engaged over turnbuckle fittings of the eye or fork type either in broadwise or edgewise relation therewith. Turnbuckle end-fittings of standard designs are distinctive in respect to the manner in which the cable ends are connected therewith and may be of the fork or eye type in which the cable end is held in place by a bolt and nut connection or they may be of the pin or shaft type in which the cable end is inserted and gripped in a drilled or swaged end of the shaft. The shaft is threaded on the opposite end for engagement with the turnbuckle barrel and a hexagon shoulder is provided between the swaged end and the barrel end. The fittings common to a turnbuckle barrel may include all the different types and, hence, are interchangeable to meet different conditions or requirements of cable installations. The amount of tensile strength that may be applied to the cables through adjustment of a turnbuckle is limited by the size of the latter. Consequently, turnbuckles are made in several sizes respectively predicated on selected values of tensile strength, such as 800 lbs., 1600 lbs., 2100 lbs., etc. After adjustment, the turnbuckle barrel and the end-fittings customarily are tied together against relative displacement by a safety wire in a well known manner.

A section of a typical cable installation is shown in Figure 3. The cable is assumed to be rigged or installed in an airplane with a turnbuckle inserted in the line and connecting the cable ends 17 and 18. The turnbuckle comprises the barrel 19 and the end-fitting 20 and 21; the latter being of the fork type with the cable ends inserted between the prongs 22 and 23 of the forks and held in place by the bolts 24 and nuts 25. When the turnbuckle barrel is rotated to move the end-fittings inwardly toward each other and thus impose an increased tension on the cable, the end-fittings also tend to rotate with the barrel and to twist the cable. However, in order to maintain a true tension on the cable, the latter must not be twisted. In the event of a twist, the cable winds up in a manner similar to a spring so that, after final adjustment and safetying of the turnbuckle, the tendency of the cable to unwind and thereby unscrew the fitting from the turnbuckle barrel imposed additional strain on the tie wire. In time, the latter will break and thus permit the turnbuckle to loosen in response to the twist or strain with resultant loss of tension in the cable. Such action can readily reduce the required tension as much as 10 pounds which, in many instances, will cause the entire cable system to be out of balance.

By the use of the turnbuckle jig constituting the subject matter of the present invention, adjustment of the turnbuckle is accomplished without any twist of the cable. The length of the jig is first adjusted, by turning the handle 1, to conform to the length of the turnbuckle 19 to which it is to be applied. The forked portions 14 of the jaw members are then placed over the turnbuckle end-fittings 20 and 21, with the latter received in slots adapted to fit their particular size and wherein they are restrained against rotative movement. In this position of the jig, the handle 1 is disposed substantially in parallelism with the turnbuckle and in outwardly spaced relation to the turnbuckle barrel so as not to interfere with the turning of the barrel. In applying tension to the cable, the rigger turns the barrel with the fingers of one hand while maintaining the jig in position with the fingers of the other hand grasping the handle 1, as depicted in Figure 3. Although the end-fittings 20 and 21 are restrained against axial turning movement by the confining walls of the slots in which they are received, they are free to slide axially through the slots within limits sufficient under most requirements of cable tensioning to necessitate no change or adjustment in the spacing of the jaw members 7 and 13. However, whenever such change or adjustment is necessary it can be accomplished readily by turning handle 1. In fact, adjustment of both the jig handle 1 and the turnbuckle barrel 19 can be adjusted with the fingers of the respective hands either simultaneously or alternately as required and without disengaging the jig from the turnbuckle. Thus, with the use of the jig in the manner described, one person may adjust the turnbuckle barrel to impose more or less tension on the cable and at the same time maintain a neutral lay in the cable.

When using the turnbuckle jig with a turnbuckle having an end-fitting of the pin or swaged type, the hexagon shoulder of the fitting is engaged in a correspondingly sized slot or jaw 16 of the jig and held thereby from turning when the turnbuckle barrel is placed upon the threaded end of the fitting or subsequently turned thereon for adjusting the tension of the cable. The turnbuckle jig also may be disassembled for separate use of the parts thereof in close quarters. For example, where the tool is required in a small opening in an airplane where only a hand can enter, it is possible to use unit 7 or unit 13 and fasten same to the rib of the airplane or, space permitting, the handle unit 1 in connection with units 13 or 7 may be used, leaving a hand free for adjustment of the turnbuckle barrel.

The use of the jig in connection with tubing and connectors is substantially the same as when used for cable installations. The tubing indicated at 26 in Figure 4 of the drawing is used particularly with wing gun engine controls and contains one or more rivets 27 near the end for uniting the two parts. The turnbuckle jig is applied to the portion of the tubing where the rivets are installed so that the tube is in the proper sized slot with the ends of the rivet adapted to abut and frictionally bear against the interior sides of the slot to prevent turning of the tube within the slot. The rivet thus acts as a stop if the tube attempts to rotate.

Having thus described the invention, I claim:

1. A turnbuckle jig comprising a telescopic handle consisting of two screw-threadedly engaged and adjustable members, and a jaw member connected with and pendent from the outer end of each handle member and having spaced jaw faces between which the end-fittings of a turnbuckle are adapted to be received and thereby restrained against turning movement relative to the jaw member, one of said jaw members having a swivel connection with its associated handle member whereby it is adapted to be turned relative thereto for adjusting the length of the handle and hence the spacing between the jaw members.

2. A turnbuckle jig comprising an adjustable telescopic handle of two screwed threadedly engaged members, and a jaw member connected with and pendent from the outer end of each handle member, each jaw member having jaw portions for engaging turnbuckle end-fittings of varying types and sizes and restraining same from turning therein, and one of said jaw members having a swivel connection with its associated handle member whereby the latter is rotatable relative thereto and with a screw-action on the other handle member to vary the spacing of the jaw members.

3. A tool comprising a pair of plate-like jaw members each of which has a bifurcated portion provided with spaced work-engaging jaws to fit various sizes of work, a screw rod having one end thereof fixed to one of the jaw members adjacent the closed end of the bifurcated portion and extending laterally of the member, a rotatable sleeve on said screw rod provided at one end with an internally threaded bore to receive the screw rod and at the other end being reduced in diameter to provide a shoulder and a journal, said journal being engaged with a running fit with the other jaw member adjacent the closed end of the bifurcated portion of the said other jaw member, a retainer disk abutting the said other jaw member at the outer end of the journal and serving in conjunction with the shoulder to retain the said other jaw member upon the journal, and means associated with the journal and engaging the disk for holding the latter in its abutting relation with the said other jaw member.

4. A tool comprising a pair of laterally spaced parallel jaw members, a screw rod extending spanwise between the jaw members and having one end thereof fixed to one of the jaw members, a rotatable sleeve also extending spanwise between the jaw members and in axial alignment with the screw rod, said sleeve having an internally threaded end engaged with the screw rod and having a journal on the other end engaged with a running fit with the other jaw member, and releasable means associated with the said journal for retaining it in engagement with the said other jaw member.

ULYSSES A. PROVIDENCE.